Aug. 11, 1959  K. A. KLINGLER  2,899,169
VALVE STRUCTURE
Filed Feb. 8, 1956

INVENTOR:
KARL A. KLINGLER
BY
Harvey M. Gillespie
ATT'Y

United States Patent Office 2,899,169
Patented Aug. 11, 1959

2,899,169

VALVE STRUCTURE

Karl A. Klingler, Naperville, Ill.

Application February 8, 1956, Serial No. 564,270

8 Claims. (Cl. 251—107)

The improved valve construction is embodied in a unit commonly referred to as a spray nozzle, such nozzles being designed for use at the terminal end of a length of flexible hose for emitting a water spray or jet of varying spread and intensity according to certain manual adjustments which may be made to the operative jet-producing instrumentalities associated with the nozzle. The invention is capable of use in many situations including garden and lawn sprinkling, washing automobiles and other surfaces wherein it is desirable to quickly adjust the water output or to set the delivery at a predetermined volume.

Briefly, the valve structure of the present invention comprises an outer valve casing or body having an inlet opening designed for threaded connection in the usual manner to the terminal end of a suitable flexible hose section and an outlet opening of the jet-producing type, together with valve means within the casing for regulating the outward flow of liquid through the outlet opening as well as for controlling the spread, density and volume of the jet produced as the liquid emerges from the outlet opening. The structure further includes an external actuator for controlling the valve movements and sealing means in the form of a flexible pouch into which it is sealed with respect to the casing so as to prevent passage of the liquid outwardly from the casing around the actuator.

According to the present invention, the valve body may be formed of a suitable plastic material and the valve element enclosed therein is of an elastomeric material such as rubber, either natural or synthetic. The actuator assembly is comprised of both plastic and elastomeric parts so that the entire valve assembly is, in the ordinary course of usage, unbreakable and non-corrosive as well as being otherwise of a durable nature.

The actuator mechanism employed for controlling the valve movement is of improved design and includes a releasable locking means whereby the mechanism may be locked in an infinite number of adjusted positions to which it may be moved so as to maintain the valve element, the movement of which it controls, in selected partially open positions or in its fully open position.

Another important feature of the invention resides in the provision of a novel means for mounting the elastomeric valve elements within the cylindrical bore in the casing in which it is slidable. Such means serves to very materially reduce the friction developed between the valve element and bore and at the same time simplifies centering the valve element in axial relation to the outlet port and provide passageways between the valve element and the bore of the valve casing to permit passage of fluid around the valve and through the port.

Yet another feature of the present invention resides in an extreme simplification of the various parts which cooperate to make up the valve assembly, these parts, in the main, all being capable of manufacture by simple molding processes and the parts being capable of ease of assembly and disassembly for purposes of inspection, replacement or repair.

A still further feature of the invention resides in a valve structure of this sort having associated therewith an auxiliary removable cap member applicable to and removable from the valve casing and capable, when applied to the valve casing, of stifling the jet-producing action of the valve and inducing a spray action of predetermined characteristics.

The provision of a valve assembly of the character briefly outlined above which is of compact design; one which affords a wide latitude in manufacturing tolerances yet which when assembled will effect proper cooperation of parts; one which is comprised of a minimum number of moving parts and which therefore is unlikely to get out of order; one which is of light weight construction; one which is attractive in its appearance and design; one in which the few metal parts associated therewith are completely shielded from contact with the liquid which passes through the valve assembly, and one which otherwise is well adapted to perform the services required of it, are further desirable features that have been borne in mind in the production and development of the present invention.

In the accompanying drawing the invention is shown as being associated with a conventional flexible hose and nozzle combination. However, as stated above, other adaptations are obvious and are contemplated.

Figure 1:
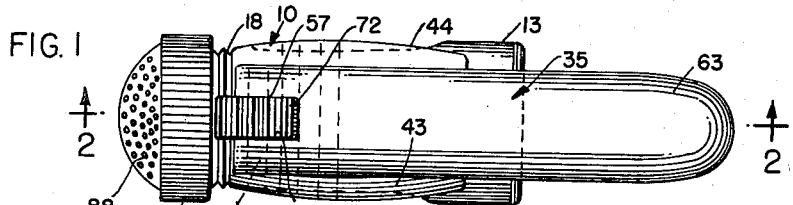
Fig. 1 is a plan view of a valve structure embodying the invention.

Referring now to the drawings, the improved valve structure comprises a generally tubular open-ended valve casing 10 having a central bore 11 which is enlarged and interiorly threaded as at 12 to receive the male end of a conventional hose fitting 13 having an externally threaded portion 14 adapted to receive thereover the threaded portion 12. The bore 11 is substantially uninterrupted and terminates at the forward end of the casing 10 in a reduced opening 15 providing a short cylindrical wall which merges with a conical outwardly diverging tapered wall 16 extending to the forward rim 17 of the casing. The forward end of the casing 10 is externally threaded as at 18 and is adapted to removably receive thereover a perforated cap member 19, the nature and function of which will be set forth presently.

The reduced opening 15 and the central bore 11 provide at the forward end of the internal valve chamber 20 a radial shoulder 21 providing a valve seat designed for cooperation with a slidable valve element 22 which is centered within the bore 11 and which is axially movable into and out of engagement with the radial seat 21 in a manner that will be made clear presently.

The valve element 22 is generally of cylindrical design and includes a main body portion 23 having a reduced relatively short forward extension 24 formed thereon which provides a forwardly facing annular sealing shoulder 25 designed for sealing engagement with the rearwardly facing shoulder 21 at the outlet end of the valve chamber 20. A generally conical protuberance 26 extends forwardly from the front face 27 of the extension 24 and cooperates with the wall of the opening 15 and with the conical surface of the wall 16 in the creation of a cone-like jet or spray of the liquid passing through the valve assembly.

Figure 3:
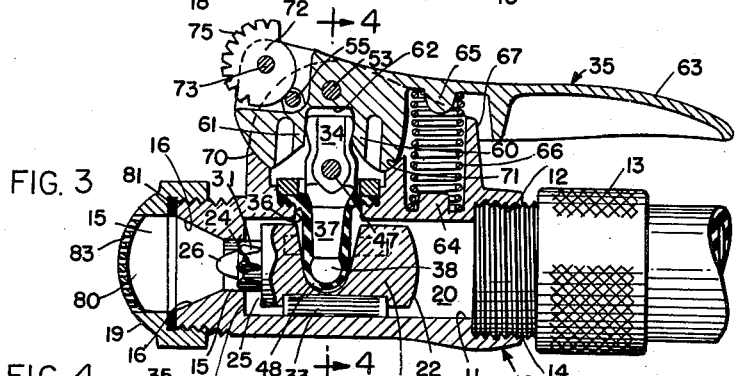
Fig. 3 is a view similar to Fig. 2 showing the valve in its fully open position.

The valve element 22 is movable between the retracted position shown in Fig. 3 wherein the reduced extension 24 barely enters the opening 15 to an advanced position wherein the extension is completely confined within the opening and wherein the sealing shoulder 25 seats against the cooperating shoulder 21 to completely close the valve. In this latter position the hydraulic pressure built up within the chamber 20 assists in maintaining the valve in its fully closed position. The external diameter of the extension 24 is approximately equal to the internal diameter of the opening 15 so that the extension may move or slide within the opening with a relatively tight fit.

Figure 6:
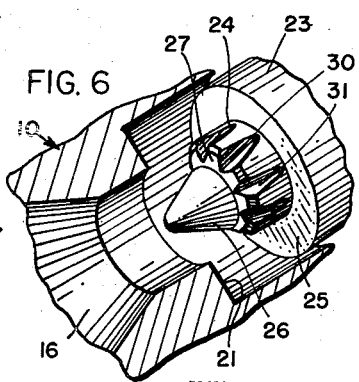
Fig. 6 is an enlarged detailed perspective view showing a portion of the valve structure in the vicinity of the outlet opening of the valve casing and showing the valve element in its opened position.

As shown in Fig. 6, the cylindrical surface of the valve extension 24 is formed with a series of generally V-shaped grooves 30 therein which may be of any suitable number, which function to proportionately vary the liquid discharge in relation to the extent of the opening movement of the valve. Adjacent grooves 30 define therebetween a series of tapered ribs 31, the outer surfaces of which are arcuate and which ribs taper in such a manner that their sides diverge outwardly and rearwardly to their regions of juncture with the sealing shoulder 25. Thus it will be seen that when the valve element 22 is in its fully retracted position as shown in Fig. 3, a relatively large passage for the liquid under pressure within the chamber 20 through the opening 15 is provided since a major portion of the groove is exposed to the interior of the chamber 20 and a consequently large volumetric flow of liquid through each groove is made possible. As the valve element 22 is moved to the left from its extreme position shown in Fig. 3, the reduced portion 24 thereof is moved into the confines of the cylindrical opening 15 so that progressive increments of the groove openings are moved into the cylindrical bore 15 so that each groove presents a smaller opening in combination with the wall 15 through which the liquid may pass. Thus, there is a progressive cutoff of the liquid, so to speak, until such time as the shoulder 25 on the valve body 23 engages the shoulder 21 at the end of the bore 11 at which time a complete shutoff of the liquid is effected.

Figure 4:
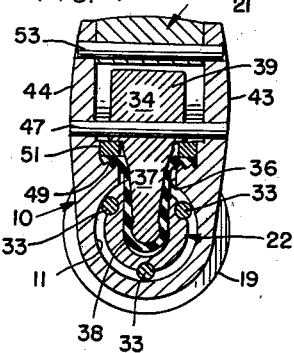
Fig. 4 is a sectional view taken substantially along the line 4—4 of Fig. 3.

In order that the valve element 22 may be properly centered within the cylindrical bore 11 to provide registry between the reduced portion 24 and the bore 15, the valve body 23 is molded so as to provide a plurality of elongated recesses 32 therein which recesses are spaced apart circumferentially and extend in parallelism. While any suitable number of such recesses may be employed, three have been disclosed herein (Fig. 4) for exemplary purposes. Seated within each recess and interposed between the bottom wall thereof and the cylindrical wall of the bore 11 of the chamber 20 is an anti-friction member 33 in the form of a cylindrical length of a suitable plastic stock. The members 33 are so designed as to have a snug fit against the surfaces between which they are interposed so that the valve element 22 together with the members 33 is slidable as a unit within the bore and so that only a relatively small amount of frictional force must be overcome to effect movement of the valve. It should be noted at this point that inasmuch as the valve element 22 is comprised of an elastomeric resilient material, fairly wide tolerances in the manufacture of the same as well as in the manufacture of the plastic casing 10 and the anti-friction members 33 are permissible and approximate alignment of the axis of the valve body with the central axis of the opening 15 will suffice to allow the reduced portion 24 to be initially forced into the opening for proper registry therewith and effective operation of the jet producing instrumentalities.

The valve element 22 is adapted to be actuated by means of a lever 34 and an actuator in the form of a handle 35 capable upon depression and release thereof to swing the lever 34 in opposite directions respectively.

The lever 34 projects through an opening 36 in the wall of the casing 10 and has a finger portion 37 having a bulbous lower end 38 which is received in a socket 40 formed in the side of the valve body 23. The upper region 39 of the lever 34 is enlarged and is generally of square cross sectional shape, there being a pair of shallow recesses 41 and 42 respectively in the front and rear faces thereof designed for camming engagement with certain portions of the handle 35. The casing 10 is formed with a pair of spaced upstanding side flanges 43 and 44 (Figs. 1 and 4) and with a pair of spaced transverse walls 45 and 46 which bridge the distance between the flanges. The lever 34 is pivoted medially of its ends by means of a pintle pin 47 which extends through the lever and has its ends secured by a pressed fit in suitable openings provided in the side flanges 43 and 44.

In order to seal the finger portion 37 of the lever 34 with respect to the valve body 10 against escape of fluid through the opening 36, the finger portion 38 is encased in a molded, flexible, tubular sealing mantle or pouch 48 in the form of a thimble having at its open end an annular flange portion 49 (Fig. 4) seated on a ledge 50 surrounding the opening 36 in the casing. A ring member 51 encompasses the medial region of the lever 34 and seats upon the annular flange 48 under pressure and serves to clamp the flange against the ledge, the ring being maintained in position by the pintle pin 46 against which it bears.

Figure 5:
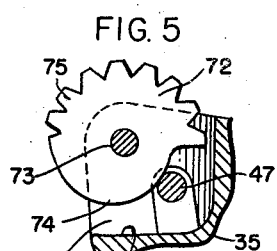
Fig. 5 is an enlarged detailed fragmentary sectional view illustrating a locking cam member.

The actuator or handle 35 includes a relatively thick solid body portion 52 adjacent its forward end and through which portion there extends a second pintle pin 53, the ends of which are likewise secured by a pressed fit in the side walls or flanges 43 and 44. The pintle pin 53 constitutes a fulcrum axis for rocking movement of the handle 35 throughout a limited degree of rocking movement. The body portion 52 of the handle 35 is formed with a cutaway recess 54, this recess existing at the extreme forward end of the actuator and a limit stop pin 55 (see also Fig. 5) extends through a pair of relatively short arcuate slots 56 provided in the side walls 57 of the recess 54 (Fig. 1) and has its ends secured by a pressed fit in the flanges 43 and 44. The pin 55, being a fixed pin, serves to limit the rocking movement of the actuator or handle 35 and for this purpose it is engageable with the opposite ends of the slots 56 provided in the walls 57 of the recess 54.

Figure 2:
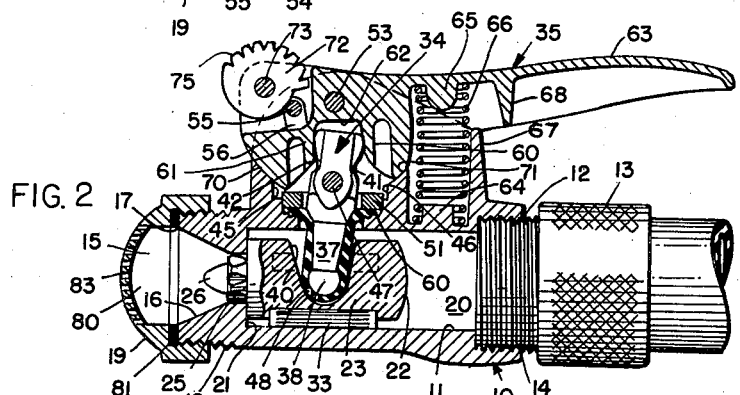
Fig. 2 is a sectional view taken substantially along the line 2—2 of Fig. 1.

Formed on the body portion 52 of the actuating handle 35 are a pair of depending transverse ribs 60 and 61 defining therebetween a transverse slot 62. The ribs straddle the upper end of the lever 34 and are designed for camming engagement with the respective shallow recesses 41 and 42 at a substantial distance above the pivotal axis 46 of the lever 34. The handle 35 is provided with a rear extension 63 designed for engagement with the palm portion of the hand so that this extension may be depressed toward the body 10 of the valve to thus rock the lever 35 about its pivotal axis 53 whereby the rib 61 will engage an inclined surface of the depression 42 in the side of the lever 34 and, by a camming action, tilt the lever in a counter clockwise direction to thus cause the finger 37 to force the valve element 22 to the right as shown in Fig. 2.

A pair of opposed centering buttons or lugs 64 and 65 formed on the valve body 10 and handle 35 respectively serve to maintain a coil spring 66 in an interposed position between the body 10 and the handle portion 63 of the actuator so as to urge the latter to the normal position shown in Fig. 3 wherein the valve is maintained in its open position. An upstanding curved transverse wall 67 is formed on the body portion 10 at the rear side of the spring 66 and partially encompasses the latter and serves as a protective shield for the same. A transverse rib 68 formed on the inside of the handle portion 63 of the lever 35 overlaps the upstanding wall 67 and further serves to shield the spring 66 as well as to conceal the same.

It is to be noted that the width of the solid body portion 52 of the actuator or handle 35 is substantially equal to the distance existing between the side flanges 43 and 44 so that there is a relatively snug working fit between these parts. The depending ribs 60 and 61 provided on the body portion 52 of the actuator are formed with arcuate surfaces 70 which have running engagement with similar concave arcuate surfaces 71 formed on the transverse upstanding walls 45 and 46 and the transverse axis of the pivot pin 53 is so positioned with respect to the side flanges 43 and 44 that a fairly tight running fit is obtained between these mating surfaces so that there will be no looseness or lost motion between the handle 35 and the casing on which it is mounted. In this manner lateral thrust on the pivotal pin 53 is eliminated and the actuator is supported on the casing at three regions so as to lend stability to the same.

From the above description it will be seen that the handle or actuator 35 is of a novel squeeze-type construction. Additionally, means are provided whereby the actuator may be locked in an infinite number of positions of adjustment to maintain the valve in various open positions. Such locking of the actuator, and consequently of the valve element 22, in selected predetermined positions is obtained by virtue of a so-called locking wheel or cam 72 (Fig. 5) in the form of an irregularly shaped but generally cylindrical tubular member which spans the distance between the side walls 57 of the slot 54 and which is turnably mounted on a pintle pin 73, the ends of which are press fitted in openings provided in these side walls. The locking member 72 is formed with a curved cam surface 74 of progressively increasing eccentricity and which surface is designed for frictional locking engagement with the previously mentioned limit stop pin 55. The locking member 72 is also provided with a knurled or ribbed peripheral surface 75 for finger manipulation. The curvature of the cam surface 74 is designed according to engineering exigencies so that a very strong wedging action is attained against the limit stop pin 55 when the actuator or handle 35 is depressed throughout any selected degree of arcuate swinging movement and the locking wheel 72 turned so that an increment of its surface bears tangentially against the pin 55. For example, as shown in Fig. 3 wherein the actuator 35 is fully depressed, the locking wheel 72 may be turned from its retracted position throughout an angle of approximately 90° so that a high point on the cam surface 74 engages the limit stop pin 55. With the parts in the position shown, the locking wheel is wedged against the pin 55 in a near dead center position so that, although the spring 66 serves to urge the actuator in a counter clockwise direction about the pivotal axis 53, movement of the actuator is prevented inasmuch as the distance between the centers of the pins 73 and 55 is greater than one-half the distance between the centers of the pins 73 and 53. This relationship holds true regardless of the position of the actuator 35.

Under certain instances it may be desirable that the valve assembly or hose nozzle construction of the present invention be employed for the purpose of creating a relatively gentle and uniform spray simulating that which is emitted from the nozzle portion of a conventional garden watering can spout. To effect such an operation the perforated cap member 19 is threadedly received on the externally threaded portion 18 of the valve body portion. This cap 19 is provided with a series of spray openings 80 in the crown portion thereof which are preferably symmetrically and equally spaced so that a uniformly patterned series of individual streams of water will be emitted through the cap when the valve member 22 is moved from its fully closed position. A suitable washer 81 of rubber or other similar elastomeric material is interposed between the forward rim 17 of the outlet opening and the rim portion of the cap to prevent leakage of the liquid past the cooperating threads on the cap and body portion. It will be seen that when the cap member is in position the jet producing functions of the valve assembly are disabled and the valve element 22 operates simply as a variable orifice flow valve to control the rate of flow or discharge of liquid from the chamber 20 through the opening 15 into the space 83 existing between the cap member 19 and the conical wall 16. The intensity of the spray will thus be controlled by manipulation of the actuating handle 35.

I claim:

1. In a valve construction, a valve casing having a fluid chamber therein, a discharge port in communication with said chamber, a valve body composed of resilient material slidably disposed within said chamber and yieldable to compensate for variations in its size and in the size tolerance of parts associated therewith, means for supporting the valve body in axial alignment with said port and spaced from the casing to permit passage of fluid between the valve and said casing comprising a plurality of rigid anti-friction rod elements arranged in spaced apart relation circumferentially about said valve body and having a snug fit between the resilient valve body and the inner wall of said fluid chamber, and means extending through a side of the casing and loosely penetrating the valve body for operating the valve body.

2. In a valve construction as set forth in claim 1, wherein the valve body is of cylindrical form and formed in its outer surface with channels extending lengthwise thereof for receiving said anti-friction rod elements, whereby the anti-friction rod elements are pressed resiliently against the casing to accurately support the valve body in its centered position relative to said port.

3. In a valve construction, a valve casing provided with a valve chamber having an opening through its side, said casing having formed thereon a pair of external spaced parallel side flanges, a discharge port in communication with said chamber, a valve body slidably disposed in said chamber for opening and closing said port, an operating lever extending through said opening and having its inner end operatively connected to said valve body, a pin extending through said lever and having its ends secured in said flanges and serving to pivotally support said lever for swinging movement about the axis of said pin, an actuator for said lever, a pin extending through said actuator and having its ends secured in said side flanges and on which the actuator is pivotally mounted for limited rocking movement, said actuator having camming engagement with the outer end of the lever at a region outwardly removed from the axis of swinging movement of the latter whereby rocking movement of the actuator will impart correspondent swinging movement to the lever, there being a transverse slot formed in said actuator, a locking pin projecting through said slot and having its ends secured in said side flanges, a locking element pivotally mounted on said actuator for frictional locking engagement with said locking pin in a position of said actuator, and spring means normally urging said actuator in a direction to cause said locking element to move into engagement with said locking pin.

4. In a valve construction according to claim 3 wherein said actuator is formed with a recess therein presenting a pair of parallel side flanges, a pin having its ends secured to said side flanges, said locking element being pivotally mounted on said latter pin within said recess for turning movements about the axis thereof.

5. In a valve construction according to claim 4, said construction being characterized by the fact that the opposite ends of said slot provided in the side flanges of said recess are designed for alternate engagement with the side of said locking pin to limit the rocking movements of said actuator in opposite directions respectively.

6. In a valve construction for producing a variable pattern liquid jet discharge, a valve casing having a cylindrical bore defining a valve chamber therein for the passage of fluid axially through the casing, a discharge port in communication with said bore at one end of the casing, a radially disposed annular sealing shoulder surrounding said discharge port, a cylindrical valve body slidably disposed in said bore and having a reduced forward extension extending into said port with a sliding fit, a radially disposed annular sealing shoulder on said valve body surrounding said cylindrical extension, said valve body being movable from a fully retracted position wherein said reduced extension is at least partially withdrawn from said discharge port and said shoulders are out of engagement with each other to an advanced position wherein said reduced extension is projected completely into said discharge port and said shoulders are in coextensive sealing engagement with each other, there being a series of forwardly and inwardly tapered ribs on said reduced extension defining therebetween a series of grooves providing tapered passages for the discharge of liquid from said valve chamber, means for slidably supporting said valve body within said bore, said means comprising a plurality of circumferentially spaced longitudinally extending troughs formed in the cylindrical surface of said valve body, an elongated rod-like cylindrical anti-friction member seated within each trough and having a line contact with the inner cylindrical surface of said bore, and means extending through said casing and operatively connected to said valve for moving the latter axially in said bore.

7. In a valve construction for producing a variable pattern liquid jet discharge, a valve casing having a bore defining a valve chamber therein for the passage of fluid axially through the casing, a discharge port in communication with said bore at one end of the casing, a radially disposed annular sealing shoulder surrounding said discharge port, a cylindrical valve body slidably disposed in said bore and having a reduced forward extension extending into said port with a sliding fit, a radially disposed annular sealing shoulder on said valve body, said valve body being movable from a fully retracted position wherein said reduced extension is at least partially withdrawn from said discharge port and said shoulders are out of engagement with each other to an advanced position wherein said reduced extension is projected completely into said discharge port and said shoulders are in coextensive sealing engagement with each other, there being a series of forwardly and inwardly tapered ribs on said reduced extension defining therebetween a series of grooves providing tapered passages for the discharge of liquid from said valve chamber, there being a socket formed in said valve body in one side thereof, there being an opening formed in the wall of said casing and communicating with said bore, a tubular pouch member formed of flexible material and having one end closed, the other end of said pouch member being open and formed with an outwardly extending annular flange, said flange being seated on an external portion of said casing in sealing engagement therewith, a pair of side flanges formed on said casing laterally thereof, an operating lever projecting through said opening and having its lower regions extending into said pouch member and its upper regions projecting upwardly of the casing between said side flanges, a ring member overlying said annular flange for forcing the same against said casing, a pivot pin extending through said lever and having its opposite ends secured in said side flanges, said pivot pin bearing against said ring member and serving to clamp the same against said annular flanges, and an actuator pivoted between said side flanges and having camming engagement with the outer end of said lever for actuating the same.

8. In a valve construction for producing a variable pattern liquid jet discharge, a valve casing having a bore defining a valve chamber therein for the passage of fluid axially through the casing, a discharge port in communication with said bore at one end of the casing, a radially disposed annular sealing shoulder surrounding said discharge port, a cylindrical valve body slidably disposed in said bore and having a reduced forward extension extending into said port with a sliding fit, a radially disposed annular sealing shoulder on said valve body, said valve body being movable from a fully retracted position wherein said reduced extension is at least partially withdrawn from said discharge port and said shoulders are out of engagement with each other to an advanced position wherein said reduced extension is projected completely into said discharge port and said shoulders are in coextensive sealing engagement with each other, there being a series of forwardly and inwardly tapered ribs on said reduced extension defining therebetween a series of grooves providing tapered passages for the discharge of liquid from said valve chamber, said casing having formed thereon a pair of longitudinally extending parallel side flanges and a pair of spaced transversely extending walls, there being an opening formed in said casing in communication with said bore, an operating lever pivoted medially its ends between said side flanges for swinging movement about a transverse axis, means operatively connecting the inner end of said lever to said valve body, an actuator pivotally mounted between said side flanges for swinging movement about a transverse axis, said actuator being formed with a transverse slot therein into which the outer end of said actuating lever extends, the side walls of said slot having camming engagement with the sides of said lever upon rocking movement of said actuator, said transverse walls and actuator being formed with cooperating sliding friction surfaces capable of relative sliding movement upon rocking of said actuator, means normally urging said actuator in one direction to in turn cause said operating lever to move to its advanced position, and cooperating releaseable locking means supported on said side flanges and actuator respectively for locking said actuator in any desired position of adjustment.

References Cited in the file of this patent

UNITED STATES PATENTS

| | | |
|---|---|---|
| 733,954 | Frederick | July 21, 1903 |
| 957,347 | Kennedy | May 10, 1910 |
| 2,303,145 | Taylor | Nov. 24, 1942 |
| 2,375,906 | Falcon | May 15, 1945 |
| 2,382,151 | Harper | Aug. 14, 1945 |
| 2,523,084 | Adragna | Sept. 19, 1950 |
| 2,565,457 | Spender | Aug. 21, 1951 |
| 2,584,745 | Seliber | Feb. 5, 1952 |
| 2,651,372 | Vanderwall | Sept. 8, 1953 |
| 2,713,988 | Kitterman | July 26, 1955 |